Oct. 12, 1965 R. E. HAGER 3,212,081

DATA DISPLAY INDICATORS

Filed June 3, 1960 2 Sheets-Sheet 1

Oct. 12, 1965 R. E. HAGER 3,212,081

DATA DISPLAY INDICATORS

Filed June 3, 1960 2 Sheets-Sheet 2

INVENTOR.
Robert E. Hager
BY W. L. Stout.
HIS ATTORNEY

3,212,081
DATA DISPLAY INDICATORS

Robert E. Hager, Avalon, Pa., assignor to Westinghouse Air Brake Company, Wilmerding, Pa., a corporation of Pennsylvania Filed June 3, 1960, Ser. No. 33,761
7 Claims. (Cl. 340—347)

Figures 1, 2, 3A, 3B:
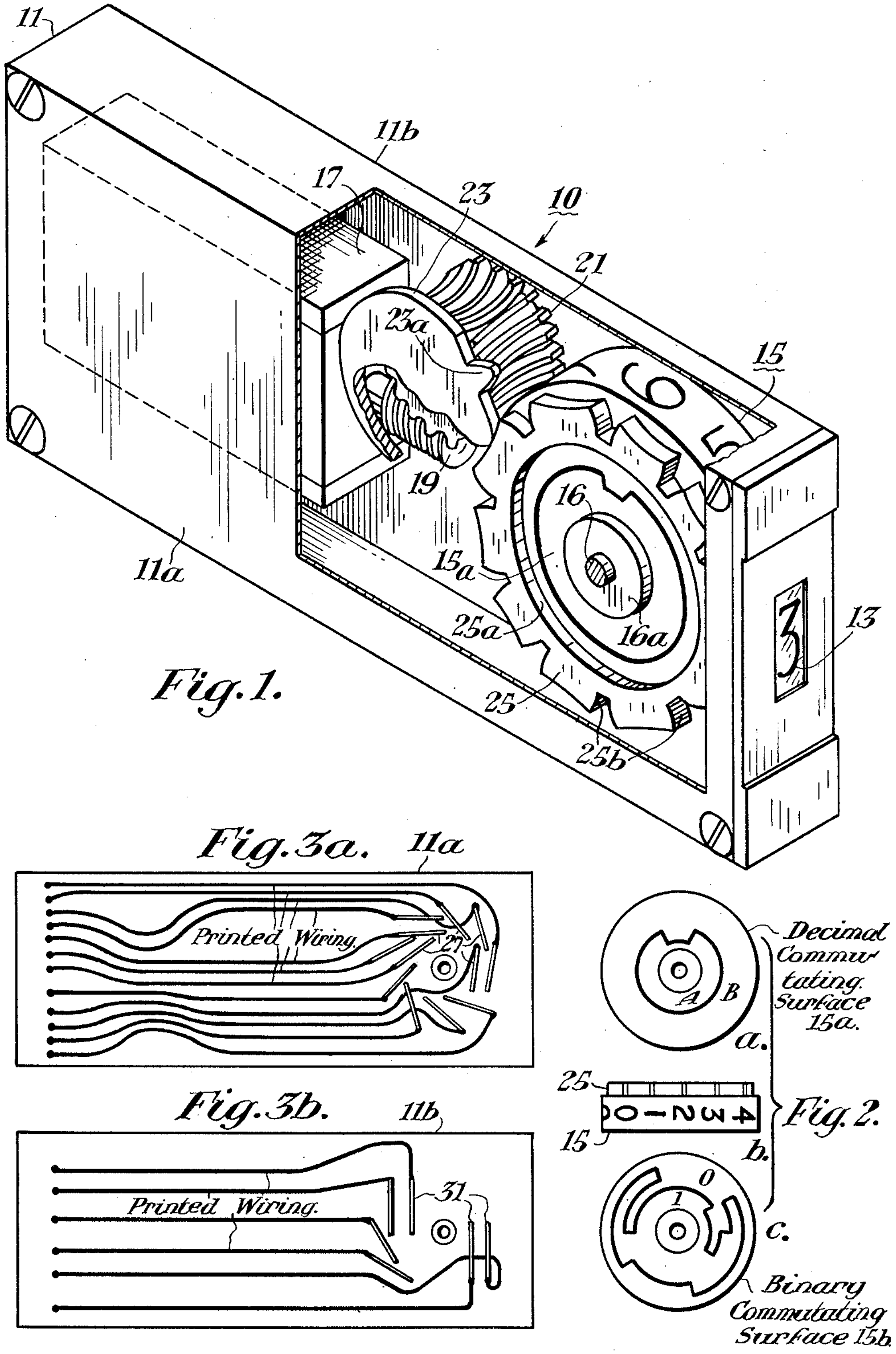

My invention relates to data display indicators, and more particularly to a data display indicator which stores and displays intelligence and which is arranged to translate or convert from one type of logical code to another type of logical code.

Accordingly, it is a principal object of my invention to provide a new and improved data display indicator providing the foregoing functions.

Conversion of one type of logical code to another type of logical code is needed in a number of applications. More specifically, translation or conversion of decimal code to binary code and of binary code to decimal code is especially desirable in, for example, computer type applications. One such application is that in which an operator can insert decimal code by means of a keyboard to a computer requiring binary code operation. Decimal type data is, of course, more familiar to most operators than any other type of data. Decimal keyboards are utilized since it is readily possible to visually check by means of readout devices the inserted data and, additionally, a decimal keyboard takes a minimum number of contacts per key button. Also, it is advantageous that the decimal to binary code conversion be visually checked on the readout device before the binary electrical data is fed to the computer or other device requiring the binary code. Further, a data conversion device makes it possible to take binary output information from a computer and convert it to decimal form and display it in decimal form. Also, it is desirable that decimal data output be available electrically to operate other devices.

It is, therefore, another object of my invention to provide a data display indicator which receives and translates decimal code, that it, ten-wire code, to binary code and which receives and translates binary code to decimal code.

Another object of my invention is to provide a digital indicator operable to visually display and store either binary or decimal information.

In the attainment of the foregoing objects I provide a rotor having decimal numerals on its periphery and being rotatable in response to input signals of either decimal or binary code type to provide a visual indication corresponding to the input code. The indicator includes circuitry for translating binary code to a decimal equivalent and automatically advancing said rotor to a position in which the equivalent decimal numeral is displayed. The indicator includes additional circuitry for translating decimal code to a binary equivalent which also may be visually displayed.

Figure 4:
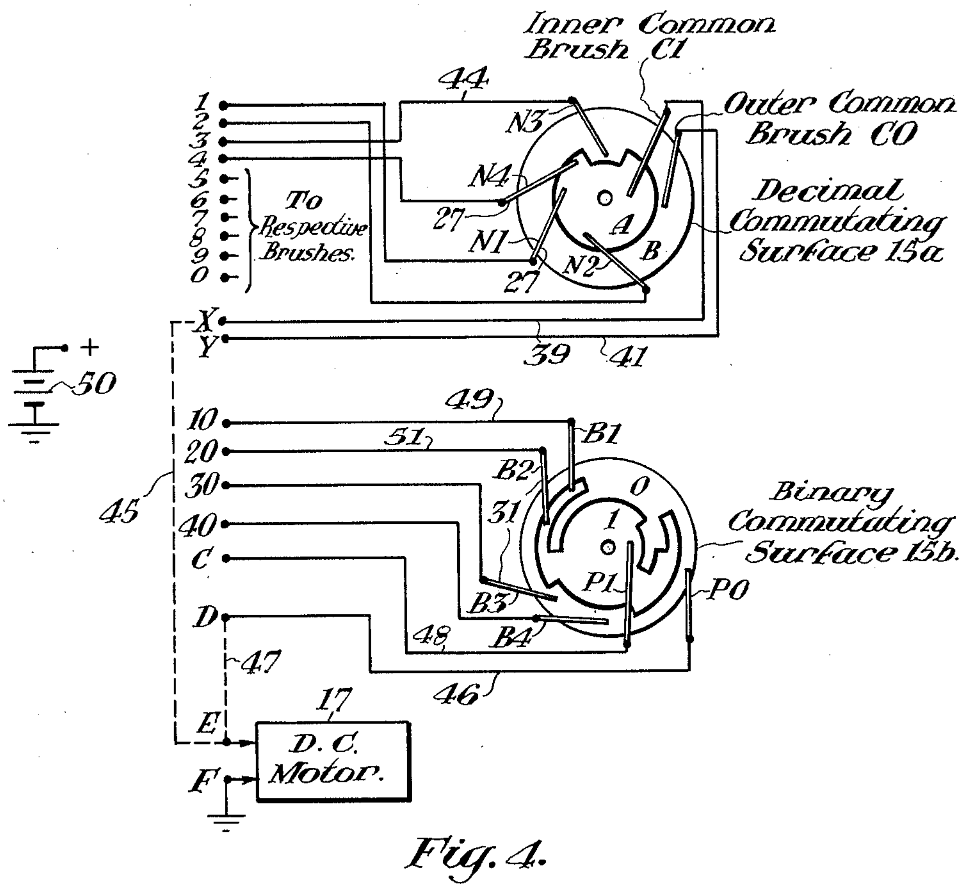

Other objects and advantages of my invention will become more apparent from the following description taken in connection with the accompanying drawings in which like reference characters refer to like elements throughout and in which:

FIG. 1 is an isometric view partly in cross section of one embodiment of an indicator according to my invention;

FIG. 2, subnumbered *a*, *b*, and *c*, shows a plan view of the rotor shown in FIG. 1 and two elevation views showing opposite sides of the rotor;

FIG. 3*a* shows a printed wiring diagram and the wire brushes which contact the commutating surface of the rotor shown in FIG. 2*a*;

FIG. 3*b* shows a printed wiring diagram and the wire brushes which contact the commutating surface of the rotor shown in FIG. 2*c*; and FIG. 4 is a schematic diagram of the circuitry for driving the motor shown in FIG. 1 in response to the input codes.

I shall first describe one embodiment of an indicator according to my invention, and shall then point out the novel features thereof in the appended claims.

It should be understood at the outset that although only conversion from decimal code to binary code and vice versa is described herein, conversion of other codes is readily effected by my device. Further conversion from one to two or more codes is possible by providing additional commutating surfaces on a rotor and the necessary associated brushes and wiring.

Referring to FIG. 1, my indicator 10 comprises a casing 11 in the form of a relatively long, thin, parallelepiped. In one embodiment, casing 11 is about 4½ inches long, ½ inch thick, and 1½ inches high. For simplicity in explanation, the following description refers to the orientation of casing 11 as shown in FIG. 1, although for operation the casing may be mounted in any position or orientation. A window 13 is formed on the front, or right-hand end of casing 11, as oriented in FIG. 1. Window 13 permits viewing of characters, more explicitly in this one embodiment the decimal numerals, formed or printed on a rotor 15 mounted within casing 11. Rotor 15 is mounted as by a center pin 16 which is received by apertures, not shown, in the sides **11*a* and 11*b* of casing 11. A center shoulder 16*a* on pin 16 acts as a stiffening member for the pin. A Geneva wheel 25 having an enlarged center aperture 25*a* and spaced indexing apertures 25*b* along its periphery is attached to one side of rotor 15. A motor 17, controlled by either binary code data or decimal code data, as will be explained hereinbelow, drives a worm 19 which engages a worm gear 21 on which is mounted a one-tooth Geneva drive plate 23. The single tooth 23*a* on plate 23 is adapted to engage the apertures 25*b* on the periphery of Geneva wheel 25 so that for every complete revolution of gear 21, wheel 25 moves in a 36° arc of a circle. An intermittent motion device is thus incorporated in indicator 10. The decimal numerals are positioned on rotor 15 such that one of the numerals is clearly visible at window 13 following each revolution of gear 21**.

In conjunction with motor 17, the worm drive consisting of worm 19 and gear 21 comprises the complete means for operating as well as stopping the rotation of rotor 15. As can be appreciated, after motor 17 drives the rotor to a control position and is subsequently deenergized, any normal overtravel of the motor will not cause the rotor to deviate from the position to which it has been operated, since the motor would be required to rotate the worm gear and plate 23 substantially a full revolution before enabling the tooth **23*a* to engage the succeeding aperture in Geneva wheel 25**.

Referring now particularly to FIGS. 2, 3*a* and 3*b*, a decimal commutating surface **15*a* is formed on one side of rotor 15 and a binary commutating surface 15*b* is formed on the opposite side of the rotor. Brushes 27 are physically affixed to side panel 11*a* of casing 11 in a manner to make contact with commutating surface 15*a* and are electrically connected to associated printed circuit wiring elements, also on panel 11*a*. Likewise, brushes 31 are affixed to side panel 11*b* of casing 11 and are arranged to make contact with commutating surface 15*b*. Brushes 31 are electrically connected to associated printed circuit wiring, also on panel 11*b*. Commutating surface 15*a*** comprises two conductive areas A and B, each insulated from one another. At varying positions of rotor 15 brushes 27 make contact with areas A and B in different combinations, whereby a desired polarity potential is applied to selected ones of brushes 27 in response to an input decimal code, as will be explained in more detail hereinbelow. Similarly, commutating surface 15*b* comprises two conductive areas 1 and 0 which are insulated from each other. Brushes 31 are arranged to make contact with areas 1 and 0, depending upon varying positions of rotor 15, whereby different combinations of potentials may be applied to brushes 31 in response to input code of the binary type, also as explained in more detail hereinbelow.

A schematic representation of the circuits for energizing motor 17 is shown in FIG. 4. To simplify the drawing, only several of the brushes and respective leads which may be associated with the decimal commutating areas A and B are shown. In FIG. 4, for explanation purposes, brushes 27 have been individually designated as N1, N2, N3, N4, C0 and C1, and brushes 31 have been individually designated as B1, B2, B3, B4, P1 and P0.

Referring first to the decimal commutating surface 15*a*, an inner common brush labeled C1 continually contacts the inner commutating area A, and an outer common brush labeled C0 continuously contacts the outer commutating area B. Brushes C1 and C0 are connected through printed circuit leads 39 and 41 to terminals X and Y, respectively. A plurality of brushes N1, N2, N3, N4, etc. are connected through respective printed circuit leads to the various decimal terminals labeled 1, 2, 3, 4, etc. Brushes N1, N2, N3, N4 are disposed to make contact with the commutating areas A and B in various combinations to provide an energizing signal for motor 17 through different paths whereby rotor 15 may be revolved to display the decimal numeral which corresponds to the incoming code.

To operate the indicator in response to decimal code input, a lead 45 is connected, by means of an external switching circuit (not shown), between terminal X and terminal E of motor 17; the other terminal F of the motor is connected to ground, as shown. A decimal code can now be coupled to the indicator to obtain a corresponding decimal character display.

In practice, the decimal code may assume the form of a positive potential which is applied selectively over the external circuit only to that terminal which corresponds numerically to the character that is to be displayed. At the same time, the remaining decimal terminals will be completely disconnected from the output side of the external circuit so that, effectively, zero volts is applied to them.

For explanation purposes, assume first that it is desired to display decimal numeral 3. Decimal terminal 3, therefore, is energized by a positive potential. Assuming next that upon energization of decimal terminal 3 brush N3 is connected with inner conductive area A, the circuit path for energizing motor 17 is as follows: terminal 3, lead 44, brush N3, area A, common brush C1, lead 39, terminal X, lead 45, terminal E, and through the internal circuit of motor 17 to terminal F and ground. With the motor circuit completed, rotor 15 is operated until the above-traced circuit path is interrupted. This occurs when brush N3 makes contact with area B rather than with area A, as shown in FIG. 4. Rotor 15 is now in a position to display the numeral 3, thereby identifying the code signal applied to the decimal terminals.

It will be seen that when the rotor stops in a selected position, all of the decimal brushes which make contact with conductive area A are deenergized at the decimal terminal end, and if the connection between the external circuit and the selected decimal terminal is interrupted and a positive potential is supplied to terminal Y, the decimal terminals remain energized or deenergized in accordance with the code signal by which the indicator was operated. The rotor position may thus be indicated electrically by the signal which its decimal brushes supply to the decimal terminals, as well as by the visual display of a numeral.

Referring now to the binary commutating surface 15*b*, an inner common brush labeled P1 continually contacts the area 1 while an outer common brush labeled P0 continually contacts the area 0. Brush P1 is connected through lead 48 to terminal C and brush P0 is connected through lead 46 to terminal D. During operation from binary input data, and also during conversion from decimal to binary code, terminal C is connected externally to the positive (+) terminal of a source of potential shown as, for example, to the left of FIG. 4, a battery 50.

Four brushes B1, B2, B3 and B4 contact areas 1 and 0 in various combinations in response to binary code data. Binary data is coupled from input terminals 10, 20, 30, 40 to brushes B1, B2, B3 B4, respectively, in a code, for example, as given in the following chart:

*Table*

| Position and Symbol of Rotor 15 | Brushes | | | | Position and Symbol of Rotor 15 | Brushes | | | |
|---|---|---|---|---|---|---|---|---|---|
| | B1 | B2 | B3 | B4 | | B1 | B2 | B3 | B4 |
| 1 | 1 | 0 | 0 | 0 | 6 | 0 | 1 | 1 | 0 |
| 2 | 0 | 1 | 0 | 0 | 7 | 1 | 1 | 1 | 0 |
| 3 | 1 | 1 | 0 | 0 | 8 | 0 | 0 | 0 | 1 |
| 4 | 0 | 0 | 1 | 0 | 9 | 1 | 0 | 0 | 1 |
| 5 | 1 | 0 | 1 | 0 | 0 | 0 | 0 | 0 | 0 |

In this chart, in the numbers in binary notation which designate code combinations, the value "1" indicates a connection externally completed with a source of positive potential, and the value "0" indicates a connection through the external circuit with terminal D. As will appear, the values "1" and "0" therefore designate the energized and deenergized conditions, respectively, of the control wires 10, 20, 30 and 40 and hence, also designate the respective conditions of brushes B1, B2, B3, and B4.

During operation of the indicator from a binary input, terminal D is connected externally by means of lead 47 to terminal E of motor 17; the other terminal F of motor 17 remains connected to ground. The binary code, as will be seen, energizes brushes B1, B2, B3, and B4 in various combinations to provide an output to drive motor 17 and thus rotate rotor 15 until the numeral displayed by the rotor corresponds to the binary input code.

For example, assume that decimal 3 is to be displayed in window 13 in response to an equivalent binary code input. Binary code 1100, as shown in the table, is therefore applied to terminals 10, 20, 30 and 40 so that terminals 10 and 20 have a positive potential applied thereto. The remaining terminals 30 and 40 are connected automatically, by means of the external switching circuit, with terminal D.

Assume next that brushes B1, B2, B3 and B4 take up random positions other than those in which they are shown in FIG. 4, but that either brush B1 or B2, or both, contacts area 0, and that either brush B3 or B4, or both, contacts area 1. Under such conditions, one circuit path for energizing the motor extends from terminals 10 and/or 20, leads 49 and/or 51, brushes B1 and/or B2, area 0, common brush P0, lead 46, terminal D, lead 47, input terminal E of the motor, and through the internal circuit of the motor to terminal F and ground.

An alternate circuit for energizing motor 17 can also be traced from the positive (+) terminal of battery 50, through terminal C, lead 48, brush P1, area 1, brushes B3 and/or B4, either of two suitable lead wires in circuit between brushes B3 and B4 and binary terminals 30 and 40, respectively, through the above-mentioned external connections to terminal D, lead 47, terminal E of the motor, and internally of the motor to terminal F and ground. It will be understood that, since conductive areas 1 and 0 on commutating surface 15*b* may assume various positions relative to brushes 31 at the instant any single operating cycle commences, at least one of the foregoing paths will complete the motor circuit. The operating circuit for motor 17 will remain completed but will be opened when rotor 15 is moved to the position in which it is shown in FIG. 4, that is, in which both brushes B1 and B2 leave area 0 and move onto area 1, and both brushes B3 and B4 vacate area 1 and make contact with area 0. The decimal numerals on the periphery of rotor 15 are, of course, arranged in such manner that when the positioning cycle is completed, causing the motor circuit to be interrupted, numeral 3 is displayed in window 13. Thus a decimal numeral equivalent to the binary input code is visually displayed.

It will be clear that if the binary terminals are disconnected from the external switching circuit following movement of the rotor to a selected position, the one or more binary brushes which make contact with conductive area A remain energized and the remaining binary brushes on area 0 are kept deenergized, totally in accordance with the code signal applied to move the rotor to the required position. Thus, in the embodiment of my invention herein described, by selectively supplying the binary terminals with energy from the rotor end of the binary brushes, the position of the rotor may be indicated electrically as well as visually.

Code translation, that is, code conversion, is obtained as follows: For obtaining binary to decimal translation, the connection comprising lead 47 between terminals D and E remains undisturbed. Also, the above-noted external circuit connections which extend between terminal D and binary terminals 30 and 40 are maintained closed. However, lead 45 is interrupted externally between terminal X and terminal E, whereby terminal X becomes deenergized; terminal Y at the same time is connected externally through a positive potential as, for example, the positive (+) terminal of battery 50. It will be realized from such conditions that motor 17 is connected for operation through the binary code brushes, and the decimal section of the unit is disconnected from the motor circuit and may, therefore, be used for supplying ten-wire decimal code to decimal operated equipment.

Specifically, it will be assumed that code data is being received by the binary terminals and that it is desired to translate this data into information equivalent to a decimal code. Further, it will be assumed that the binary code supplied is equivalent to the numeral 3 so that upon completion of rotation of member 15 the binary brushes respectively make contact with areas 1 and 0 of commutating surface 15*b* in the manner shown in FIG. 4. Because of the physical relationship which exists between commutating surfaces 15*a* and 15*b*, that is, their rigid attachment to the common support member 15, commutating surface 15*a* will concurrently establish corresponding connections between conductive areas A and B and brushes N1, N2, N3 and N4 so that the relation shown in FIG. 4 between these brushes and areas A and B is established. It follows, therefore, that the positive potential on terminal Y is applied through lead 41 and common brush C0 to area B, thereby supplying brush N3 with a positive potential and, in turn, applying this potential through lead 44 to decimal terminal 3 where it may be employed to control associated apparatus responsive to a decimal code. However, brushes N1, N2, N4, etc., which make contact with area A, are deenergized by virtue of their common connection with terminal X over the path including brush C1 and lead 39. It can be seen that the circuit thus established by brushes 27 and conducting areas A and B of commutating surface 15*a* corresponds to a decimal code equivalent to numeral 3 and this numeral is, therefore, displayed.

Conversely, assume that a decimal code is being received and that translation from decimal to binary code is desired. It will be recalled that during selection of the circuit to operate in response to decimal input data, terminal X is connected to terminal E of the motor, as by lead 45; terminal Y becomes deenergized; and the connection between terminal D and terminal E of the motor is interrupted externally. With this arrangement it will be understood that the circuit paths for completing the energizing circuits of motor 17 may now extend only through decimal brushes N1, N2, N3 and N4, and that the binary section of the unit may be used to operate equipment requiring a four-bit binary code.

It will be assumed now that a decimal code input is being received and, in addition to a decimal visual display, that a decimal to binary translation is desired. As noted above, a connection, not shown, extends between terminal C and the positive (+) terminal of battery 50. It will next be assumed that decimal code data which corresponds to decimal 3 has been received so that the indicator operates to present the character 3 for display, substantially as described hereinabove. Again, due to the rigid character of the connection between commutating surfaces 15*a* and 15*b*, brushes B1, B2, B3 and B4 will be equally responsive to movement of rotor 15 during the decimal input operation so that, when the rotor is eventually positioned to display numeral 3, each of these brushes will assume the position in which it is shown in FIG. 4. As can clearly be seen, since a positive potential is connected to terminal C and this potential is applied through lead 48 and brush P1 to commutating area 1, brushes B1 and B2 and, hence, terminals 10 and 20 will also be energized by a positive potential. By virtue of terminal D being at the same time disconnected from the external circuit, brushes B3 and B4 and, thus, terminals 30 and 40 will be deenergized. As may be seen from the table, the respective energized and deenergized conditions of terminals 10, 20 and 30, 40 corresponds to a binary code output equivalent to decimal numeral 3. Suitable circuitry which may be connected to binary terminals 10, 20, 30 and 40 may be employed to utilize the binary code information.

From the foregoing, it can be seen that the apparatus of my invention reliably performs the operation of displaying characters in response to either a binary or a decimal code, also enables both converted binary and decimal data to be read out electrically for further transmission or recording, and also visually and electrically retains for an indefinite period the numeral equivalent of the code data supplied thereto.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. A display indicator comprising a member movable to a plurality of selectable positions; motive means for moving said member; first and second groups of circuits for receiving first and second types of logical data respectively; first and second groups of circuit-making elements connected with said first and second groups of circuits respectively; said first group of circuits and said first group of circuit-making elements operative when data of the first type is supplied to said first group of circuits for providing a path, dependent on the position of said member, for energizing said motive means to cause movement of said member to a position responsive to the data supplied to said first group of circuits; and circuit means electrically connected by said second group of circuit-making elements with said second group of circuits and operative when said member assumes a position responsive to said data of the first type for supplying to said second group of circuits a code signal representative of logical data of the second type.

2. In combination with an energizable actuating device, an indicator having a member operable by said actuating device to display intelligence corresponding to code signals supplied to said indicator; a first group of multiple paths for completing a circuit for energizing said actuating device consisting of a first group of circuit-making elements operative to establish varying combinations of circuit connections with and in response to movement of said member, and a first group of circuits electrically connected with said first group of circuit-making elements and arranged to receive code signals of one type; a second group of multiple paths for completing a circuit for energizing said actuating device consisting of a second group of circuit-making elements operative to establish with and in response to movement of said member varying combinations of circuit connections which are electrically independent of the circuit connections established with said member by said first group of circuit elements, and a second group of circuits electrically connected with said second group of circuit-making elements and arranged to receive code signals of one other type; first circuit means electrically connected by said first group of circuit-making elements with said first group of circuits and operative when said member assumes a position identified by the display of intelligence corresponding to code signals of said other type for supplying to said first group of circuits a code signal of said one type; and second circuit means electrically connected by said second group of circuit-making elements with said second group of circuits and operative when said member assumes a position identified by the display of intelligence corresponding to said code signals of said one type for supplying to said second group of circuits a code signal of said other type.

3. A unitary bi-code indicating device comprising a movable member carrying a plurality of symbols each selectable for display in response to an input code signal, a motor for positioning said member until correspondence is established between an input code signal and the symbol displayed by said member, a first group of input circuits for receiving decimal code signals, a second group of input circuits for receiving binary code signals, first circuit-making means associated electrically with said member for at times causing each decimal code signal received by said first group of input circuits to be supplied to the motor circuit whereby the incoming code signal is identified as the corresponding decimal symbol displayed, and second circuit-making means associated electrically with said member but insulatingly coupled with said first circuit-making means for at other times causing each binary code signal received by said second group of input circuits to be supplied to the motor circuit whereby the incoming code signal is identified as the corresponding binary symbol displayed.

4. An indicator comprising a charactered member rotatable to a plurality of selectable positions in each of which at least one character is visually displayed, motive means for rotating said member, said member having first and second commutating surfaces each surface having two conductive areas insulated from one another, first and second groups of brushes in contact with the conductive areas of said first and second commutating surfaces respectively, a first brush of each of said groups of brushes continuously in contact with a predetermined one of the conductive areas of the respective commutating surface, a second brush of each of said groups of brushes continuously in contact with the other of the conductive areas of the respective commutating surface, the other brushes of said first and second groups of brushes making contact with the first and second conductive areas of said respective commutating surfaces in varying combinations dependent on the position of said member, a first group of input circuits at times connected over said other brushes and said first brush of said first group of brushes with the circuit of said motive means and arranged to receive logical data of one type, a second group of input circuits at other times connected over said other brushes and said first brush of said second group of brushes with the circuit of said motive means and arranged to receive logical data of one other type; each path for energizing said motive means, when said one type of input data is supplied to said first group of input circuits, including said first group of input circuits, a selected one of said other brushes of said first group of brushes, said predetermined one of said conductive areas of said first commutating surface, and said first brush of the first group of said brushes; said motive means causing said member to rotate until the path including the selected one of said other brushes of said first group of brushes and said predetermined one of said conductive areas of said first commutating surface is interrupted, whereby a character corresponding to said data of said one type is displayed; and means for causing first and second potentials corresponding to logical data of said other type to be supplied to said second group of input circuits over said first and second brushes respectively of said second group of brushes and over, in varying combinations, the conductive areas of said second commutating surface and said other brushes of said second group of brushes, whereby conversion from said one type to said other type of logical data is effected.

5. A display indicator comprising, in combination, a charactered member rotatable to a plurality of selectable positions; a Geneva wheel attached to said member; motive means for driving said wheel to rotate said member; said member having first and second commutating surfaces each surface having two conductive areas insulated from one another; first and second groups of brushes so arranged to make contact with said conductive areas of said first and second commutating surfaces respectively, a first brush of each group of said brushes disposed in continuous electrical contact with one of the conductive areas of the commutating surface associated with each group; a second brush of each group of said brushes disposed in continuous electrical contact with the other of the conductive areas of the commutating surface associated with each group; the other brushes of said first and second groups of brushes disposed to make varying combination contacts, depending on the position of said member, with said conductive areas of said respective commutating surfaces; a plurality of first circuits arranged to be selectively energized by a source of energy according to a code of a first type; electrical connections between said first circuits and said other brushes of said first group of brushes; circuit means for connecting said first brush of said first group of brushes with the circuit of said motive means, whereby upon energization of each of said first circuits energy for the circuit of said motive means is applied thereto over a path including the corresponding one of said other brushes of said first group of brushes, the first of said conductive areas of said first commutating surface, said first brush of said first group of brushes, and said circuit means, said member effective upon energization of said motive means to maintain the circuit for said motive means closed until a position is reached where the character displayed is one corresponding to the order of energization of said first circuits; a plurality of second circuits; and means for coupling said source of energy with said second brush of said second group of brushes and, through the conductive area of said second commutating surface engaged by said brush of said second group, with one or more of said other brushes of said second group of brushes such that said second circuits automatically reflect a code of a second type each time said member assumes a position identifying a code of said first type.

6. A display indicator comprising, in combination, a rotor carrying decimal characters and movable to a plurality of positions; motive means for revolving said rotor, first and second commutating surfaces on said rotor each surface having two conductive areas insulated from one another; a first group of twelve brushes including ten decimal code brushes and including first and second common brushes continuously in contact respectively with one and the other of the conductive areas on said first commutating surface; circuit means for connecting said first common brush in series with the circuit of said motive means; a second group of six brushes including four binary code brushes and including third and fourth common brushes continuously in contact with one and the other of the conductive areas on said second commutating surface; said decimal and binary code brushes being adapted to electrically contact the conductive areas on the commutating surfaces respectively associated therewith and in varying combinations, depending on the position of said rotor; a first group of circuits for applying a first potential to a selected one of said decimal code brushes, whereby upon energization of each of said decimal code brushes and lack of agreement between the character displayed and the character identifying the decimal code brush receiving the first potential energy for the circuit of said motive means is supplied thereto along a path including said one conductive area of said first commutating surface, said first common brush, and said circuit means; said rotor effective upon energization of said motive means to maintain the engagement between said first common brush and said one conductive area of said first commutating surface until the decimal character displayed is one identifying the decimal code received; a second group of circuits electrically coupled with said four binary code brushes; and other circuit means effective when agreement is reached between the decimal character displayed and the decimal code received for applying through said third common brush and said one conductive area of said second commutating surface a potential to one or more of said binary code brushes whereby a binary code corresponding to the decimal character displayed is rendered electrically available at said second group of circuits.

7. A display indicator comprising, in combination, a rotor carrying decimal characters and having a plurality of positions for displaying a selected one of said characters; a motor for operating said rotor; said rotor having first and second commutating surfaces each having two conductive areas insulated from one another; a first group of twelve brushes including two common brushes and ten code brushes; a second group of six brushes including two common brushes and four code brushes; one of said common brushes of each group continuously contacting a first conductive area on the commutating surface associated with each group and the other of said common brushes of each group continuously contacting the second conductive area on the commutating surface associated with each group; said code brushes of said first and second groups being arranged to make contact with the first and second conductive areas on the commutating surface associated with each group to provide, depending on the position of said rotor, varying paths for completing the motor circuit; one of said paths including a selected one of the code brushes of said second group, the first conductive area on the commutating surface cooperating with said second group, and said one common brush of said second group; first input circuit means for selectively connecting binary code signals in the form of energy to one or more of said four code brushes of said second group, whereby upon such connection of binary code signals said motor becomes energized; said motor effective when energized to revolve said rotor until the electrical connection including the first conductive area on the commutating surface associated with said second group and the selected one of the code brushes of said second group is interrupted, whereby said rotor is positioned to display a decimal character corresponding to the incoming binary code signals; and circuit means operative when agreement is established between the display indication and the incoming binary code signals for selectively supplying through said common brushes of said first group and through the conductive areas of the commutating surface associated with said first group, a first and a second potential to the code brushes of said first group whereby decimal code signals at said first group code brushes are rendered electrically available.

References Cited by the Examiner

UNITED STATES PATENTS

| | | | |
|---|---|---|---|
| 2,700,076 | 1/55 | Goode | 340—347 |
| 2,736,017 | 2/56 | Marlowe et al. | 340—347 |
| 2,872,671 | 2/59 | Walton | 340—347 |
| 2,924,815 | 2/60 | Reynolds | 340—347 |
| 2,998,596 | 8/61 | Murphy | 340—324 |

MALCOLM A. MORRISON, *Primary Examiner.*

IRVING L. SRAGOW, *Examiner.*